United States Patent
Gandhi et al.

(10) Patent No.: US 8,744,519 B2
(45) Date of Patent: Jun. 3, 2014

(54) MULTIMODAL PHONE DATA SESSION MANAGEMENT ENHANCEMENT THAT ALLEVIATES DUAL TRANSMISSION PROBLEMS

(75) Inventors: Dhiraj Gandhi, Plantation, FL (US); Vinuthananda Bindinganavile, Bangalore (IN); Biswajit Dash, Sambalpur (IN); Robert A. Hartman, Cooper City, FL (US)

(73) Assignee: Motorola Mobility LLC, Chicago, IL (US)

( * ) Notice: Subject to any disclaimer, the term of this patent is extended or adjusted under 35 U.S.C. 154(b) by 703 days.

(21) Appl. No.: 11/610,592

(22) Filed: Dec. 14, 2006

(65) Prior Publication Data

US 2008/0146268 A1 Jun. 19, 2008

(51) Int. Cl.
*H04B 1/38* (2006.01)
(52) U.S. Cl.
USPC ....... 455/553.1; 455/552.1; 455/73; 455/500; 455/90.1
(58) Field of Classification Search
USPC ............ 455/500, 73, 88, 550.1, 552.1, 553.1, 455/557, 90.1, 90.2, 90.3
See application file for complete search history.

(56) References Cited

U.S. PATENT DOCUMENTS

| | | | |
|---|---|---|---|
| 3,846,694 A | 11/1974 | Archer | |
| 3,852,669 A | 12/1974 | Bowman et al. | |
| 4,353,037 A | 10/1982 | Miller | |
| 5,043,672 A | 8/1991 | Youn | |
| 5,204,643 A | 4/1993 | Verronen | |
| 5,235,188 A | 8/1993 | Mul | |
| 5,468,684 A | 11/1995 | Yoshimori et al. | |
| 5,524,275 A | 6/1996 | Lindell | |
| 5,682,404 A | 10/1997 | Miller | |
| 5,884,149 A | 3/1999 | Jaakola | |
| 5,946,619 A | 8/1999 | Kolev | |
| 5,995,041 A | 11/1999 | Bradley et al. | |
| 6,064,857 A | 5/2000 | Wiedeman et al. | |
| 6,067,449 A | 5/2000 | Jager | |

(Continued)

FOREIGN PATENT DOCUMENTS

| | | |
|---|---|---|
| WO | 0180445 A2 | 10/2001 |
| WO | 20050804057 A1 | 9/2005 |

OTHER PUBLICATIONS

Burgan, et al., "Monitoring And Control of Transmit Power in a Multi-Modem Wireless Communication Device", Motorola, Inc., U.S. Appl. No. 11/686,426, filed Mar. 14, 2007.

(Continued)

*Primary Examiner* — Tuan Pham

(57) ABSTRACT

One aspect of the present invention can include a dual transmit mobile communication device that includes multiple modems, a modem controller, and a data session manager. The modem controller can programmatically control the modems. The data session manager can manage data sessions of the mobile communication device. The data session manager can programmatically interact with the software modem controller to ensure that only one of the modems is transmitting at any one time. States of data communication sessions can be automatically adjusted as necessary. For example, the modem controller can block transmissions over a data traffic channel in order to use a modem other than one associated with the data traffic channel, such as using a modem to handle a dispatch session. The data session manager can preserve state information of blocked data sessions, so that the sessions can be resumed when a modem is available.

17 Claims, 2 Drawing Sheets

(56) References Cited

U.S. PATENT DOCUMENTS

| | | | |
|---|---|---|---|
| 6,141,706 A * | 10/2000 | Thornton et al. | 710/21 |
| 6,151,509 A | 11/2000 | Chorey | |
| 6,192,230 B1 | 2/2001 | van Bokhorst et al. | |
| 6,304,748 B1 | 10/2001 | Li et al. | |
| 6,549,625 B1 | 4/2003 | Rautila et al. | |
| 6,668,175 B1 | 12/2003 | Almgren et al. | |
| 6,697,953 B1 | 2/2004 | Collins | |
| 6,710,651 B2 | 3/2004 | Forrester | |
| 6,744,743 B2 | 6/2004 | Walton et al. | |
| 6,744,813 B1 | 6/2004 | Ko et al. | |
| 6,760,311 B1 | 7/2004 | Raith | |
| 6,845,246 B1 | 1/2005 | Steer | |
| 6,909,708 B1 * | 6/2005 | Krishnaswamy et al. | 370/352 |
| 6,960,956 B2 | 11/2005 | Pehlke et al. | |
| 6,985,113 B2 | 1/2006 | Nishimura et al. | |
| 6,987,986 B2 | 1/2006 | Boesen | |
| 7,069,043 B2 | 6/2006 | Sawamura | |
| 7,133,419 B1 | 11/2006 | Hendrichs et al. | |
| 7,134,029 B2 | 11/2006 | Hepner et al. | |
| 7,148,748 B2 | 12/2006 | Apel | |
| 7,187,663 B2 | 3/2007 | Schmidt | |
| 7,221,955 B2 | 5/2007 | Chen et al. | |
| 7,280,505 B2 | 10/2007 | Chaskar et al. | |
| 7,366,142 B2 | 4/2008 | Ngai et al. | |
| 7,486,975 B2 | 2/2009 | Mori | |
| 7,525,261 B2 | 4/2009 | Van Zundert et al. | |
| 7,633,898 B2 | 12/2009 | Jain et al. | |
| 8,054,826 B2 | 11/2011 | Cheng et al. | |
| 8,059,702 B2 | 11/2011 | Young et al. | |
| 8,170,604 B2 | 5/2012 | Uehara et al. | |
| 2002/0016155 A1 | 2/2002 | Charbonnier | |
| 2002/0101907 A1 | 8/2002 | Dent et al. | |
| 2002/0142791 A1 | 10/2002 | Chen et al. | |
| 2003/0078037 A1 | 4/2003 | Auckland et al. | |
| 2003/0123425 A1 | 7/2003 | Walton et al. | |
| 2003/0149904 A1 | 8/2003 | Kim | |
| 2003/0157954 A1 | 8/2003 | Medvedev et al. | |
| 2003/0208601 A1 | 11/2003 | Campbell et al. | |
| 2003/0228875 A1 | 12/2003 | Alapuranen | |
| 2004/0082295 A1 | 4/2004 | Ngai et al. | |
| 2004/0108895 A1 | 6/2004 | Wu et al. | |
| 2004/0121799 A1 | 6/2004 | Chiou | |
| 2004/0142715 A1 | 7/2004 | Oses | |
| 2004/0174833 A1 | 9/2004 | Raith | |
| 2004/0176125 A1 | 9/2004 | Lee | |
| 2004/0196804 A1 | 10/2004 | Love et al. | |
| 2004/0204181 A1 | 10/2004 | Cromer et al. | |
| 2004/0235438 A1 | 11/2004 | Quilisch et al. | |
| 2005/0075123 A1 | 4/2005 | Jin et al. | |
| 2005/0135312 A1 | 6/2005 | Montojo et al. | |
| 2005/0195787 A1 | 9/2005 | Madour et al. | |
| 2005/0201321 A1 | 9/2005 | Sinnarajah et al. | |
| 2005/0215206 A1 | 9/2005 | Granstrom et al. | |
| 2005/0240756 A1 | 10/2005 | Mayer | |
| 2005/0240786 A1 | 10/2005 | Ranganathan | |
| 2005/0242879 A1 | 11/2005 | Muller | |
| 2005/0272382 A1 | 12/2005 | Amano | |
| 2005/0282579 A1 * | 12/2005 | Kim | 455/552.1 |
| 2006/0003793 A1 | 1/2006 | Ngai et al. | |
| 2006/0067245 A1 | 3/2006 | Pearl | |
| 2006/0084359 A1 | 4/2006 | Wong | |
| 2006/0084395 A1 | 4/2006 | Kezys et al. | |
| 2006/0194540 A1 * | 8/2006 | Hunzinger et al. | 455/41.2 |
| 2006/0223577 A1 | 10/2006 | Ouzillou | |
| 2006/0229029 A1 | 10/2006 | Waltho et al. | |
| 2006/0293074 A1 | 12/2006 | Bottomley et al. | |
| 2007/0014260 A1 | 1/2007 | Seo | |
| 2007/0030063 A1 | 2/2007 | Izumi et al. | |
| 2007/0042775 A1 | 2/2007 | Umatt et al. | |
| 2007/0049239 A1 | 3/2007 | Joung et al. | |
| 2007/0111681 A1 | 5/2007 | Alberth et al. | |
| 2007/0135154 A1 | 6/2007 | Gautier et al. | |
| 2007/0285247 A1 | 12/2007 | Forster | |
| 2007/0298835 A1 | 12/2007 | Uehara et al. | |
| 2008/0053207 A1 | 3/2008 | Burgan et al. | |
| 2008/0062912 A1 | 3/2008 | Tiedemann et al. | |
| 2008/0102874 A1 | 5/2008 | Gautier et al. | |
| 2008/0118014 A1 | 5/2008 | Reunamaki et al. | |
| 2008/0130727 A1 | 6/2008 | Young et al. | |
| 2008/0130728 A1 | 6/2008 | Burgan et al. | |
| 2008/0146268 A1 | 6/2008 | Gandhi et al. | |
| 2009/0296794 A1 | 12/2009 | Min et al. | |
| 2013/0012258 A1 | 1/2013 | Burgan et al. | |

OTHER PUBLICATIONS

Young, et al., "Monitoring Multiple Modem Transmission in a Communication Device", Motorola, Inc., U.S. Appl. No. 11/686,351, filed Mar. 14, 2007.

U.S. Appl. No. 11/467,907, filed Aug. 28, 2006, in the name of Burgan, et al, 19 pages.

PCT "Notification of Transmittal of the International Search Report and the Written Opinion of the International Searching Authority, or the Declaration", Jul. 16, 2008, pp. 1-11, PCT/US2007/084906, European Patent Office.

United States Patent and Trademark Office, "Office Action Summary", Jan. 25, 2010, pp. 1-34, U.S. Appl. No. 11/686,426, Alexandria, Virginia.

United States Patent and Trademark Office, "Office Action Summary", Feb. 26, 2010, pp. 1-31, U.S. Appl. No. 11/686,351, Alexandria, Virginia.

United States Patent and Trademark Office, "Office Action Summary", Jul. 28, 2010, pp. 1-20, U.S. Appl. No. 11/686,351, Alexandria, Virginia.

Young, Feb. 6, 2007, 2 pages.

United States Patent and Trademark Office, "Non-Final Office Action Summary", Sep. 3, 2009, pp. 1-11, U.S. Appl. No, 11/426,710.

United States Patent and Trademark Office, "Non-Final Office Action Summary", Dec. 27, 2010, pp. 1-16, U.S. Appl. No. 11/426,710.

United States Patent and Trademark Office, "Non-Final Office Action Summary", Jul. 9, 2009, pp. 1-24, U.S. Appl. No. 11/553,999

United States Patent and Trademark Office, "Final Office Action Summary", Mar. 29, 2010, pp. 1-21, U.S. Appl. No. 11/553,999.

United States Patent and Trademark Office, "Final Office Action Summary", Jan. 14, 2011, pp. 1-21, U.S. Appl. No. 11/686,351.

United States Patent and Trademark Office, "Final Office Action Summary", Aug. 2, 2010, pp. 1-26, U.S. Appl. No. 11/686,426.

Kipo, "Notice of Preliminary Rejection", Feb. 28, 2011, pp. 1-6, Korean Pat. Appln. No. 10-2009-7013580.

PCT, "Notification of Transmittal of the International Search Report and the Written Opinion of the International Searching Authority, or the Declaration", Jul. 16, 2008, pp. 1-11, PCT/US2007/084906.

European Patent Office; "Communication pursuant to Article 94(3) EPC", Nov. 19, 2009, pp. 1-2, EPC Appln. No. 07 864 502.5.

United States Patent and Trademark Office, "Non-Final Office Action Summary", Sep. 3, 2009, pp. 1-34, U S Appl. No. 11/467,949, United States Patent and Trademark Office, "Final Office Action Summary", Apr. 30. 2010. pp. 1-19, U.S Appl. No. 11/467;949

United States Patent and Trademark Office, "Non-Final Office Action Summary" Jun. 10, 2011, pp. 1-51, U.S. Appl. No. 11/426,710.

United States Patent and Trademark Office, "Non-Final Rejection" for U.S. Appl. No. 11/273,231, Feb. 16, 2011, pp. 1-27

Korean Intellectual Property Office, "Preliminary Rejection" for Application No. 10-2009-7013530, Apr. 27, 2011, pp. 1-5.

United States Patent & Trademark Office "Non-Final Rejection" for U.S. Appl. No. 11/273,231 Oct. 2, 2008, 15 pages.

United States Patent & Trademark Office "Non-Final Rejection" for U.S. Appl. No. 11/273,231 Apr. 1, 2009, 13 pages.

United States Patent & Trademark Office "Final Rejection" for U.S. Appl. No. 11/273,231 Nov. 2, 2009, 22 pages.

United States Patent & Trademark Office "Non-Final Rejection" for U.S. Appl. No. 11/273,231 Aug. 19, 2010, 14 pages.

United States Patent & Trademark Office "Non-Final Rejection" for U.S. Appl. No. 11/273,231 Feb. 16, 2011, 18 pages.

United States Patent & Trademark Office "Final Rejection" for U.S. Appl. No. 11/273,231 Jul. 11, 2011, 19 pages.

United States Patent and Trademark Office, "Final Rejection" for U.S. Appl. No. 11/686,426, Aug. 2, 2010. 22 pages.

(56) References Cited

OTHER PUBLICATIONS

United States Patent and Trademark Office, "Non-Final Rejection" for U.S. Appl. No. 11/686,426, Jan. 6, 2012. 46 pages.
Patent Cooperation Treaty, "PCT Search Report and Written Opinion of the International Searching Authority" for International Application PCT/US2007/084906 Jul. 16, 2008, 11 pages.
Korean Intellectual Property Office (KIPO), "Notice of Preliminary Rejection" for Korean Application No. 10-2009-7013580 Feb. 28, 2011, 5 pages.
United States Patent and Trademark Office, "Final Rejection" for U.S. Appl. No. 11/273,231 dated Dec. 19, 2011. 26 pages
United States Patent and Trademark Office, "Non-Final Rejection" for U.S. Appl. No. 22/273,231 dated Oct. 11, 2012. 19 pages.
Hartman, U.S. Appl. No. 11/686,351, Feb. 6, 2007, 2 pages.
United States Patent and Trademark Office, "Notice of Allowance" for U.S. Appl. No. 11/686,351 May 31, 2011, 9 pages.
United States Patent & Trademark Office, "Non-Final Rejection" for U.S. Appl. No. 13/621,130 Jan. 25, 20 pages.
United States Patent & Trademark Office "Notice of Allowance and Fee(s) Due" for U.S. Appl. No. 11/686,426 Jun. 24, 2013, 19 pages.
United States Patent & Trademark Office "Notice of Allowance and Fee(s) Due" for U.S. Appl. No. 13/621,130 Jun. 27, 2013, 19 pages.
European Patent Office "Examination Report" for Patent Application No. 07 864 502.5 dated Jul. 11, 2013, 8 pages.
United States Patent & Trademark Office "Notice of Allowance and Fee(s) Due" for U.S. Appl. No. 11/686,426 Oct. 29, 2013, 20 pages.

\* cited by examiner

MULTIMODAL PHONE DATA SESSION MANAGEMENT ENHANCEMENT THAT ALLEVIATES DUAL TRANSMISSION PROBLEMS

BACKGROUND

1. Field of the Invention

The present invention relates to mobile phone handset software and, more particularly, to preventing simultaneous data and voice channel transmissions in dual channel mobile phones.

2. Description of the Related Art

Creation of dual modem devices and other technological advances have made it possible for mobile communication devices to utilize more than one transmission channel or mode, such as a data channel, a dispatch channel, and/or a voice channel. These devices are often referred to as dual mode or multi mode devices, which for simplicity are referred to generically hereafter as dual mode devices. Dual mode devices can face a scenario in which one communication channel is active and a different channel wants to come into service. Even short periods of simultaneous dual transmissions can be disallowed for some dual mode device implementations. For example, Federal Communication Commission (FCC) guidelines, such as Specific Absorption Rate (SAR) requirements, can be violated when a mobile device transmits over more than one channel at a time. Antenna diversity, software/firmware infrastructure, service agreements, and other considerations can also limit a mobile device to a single active communication channel at a time.

Simplistic solutions that would completely disable active software or active processes associated with a first channel when switching to a second channel are disadvantageous due to a loss of system state information. That is, an abrupt disconnect between different transmission modes results in a poor user experience. What would be more beneficial, yet which is currently not possible is to gracefully switch back and forth between different transmission channels in a fashion where network registration information and system state information are maintained. To illustrate with an example, a user can be engaged in a data channel operation (i.e., Web browsing), can interrupt this channel to send/receive a dispatch message over a dispatch channel, and then can re-engage the data channel at original point same logical point that was previously being utilized (i.e., can continue browsing the original Web page at the original point).

In dual mode devices, conventional handset software that controls communication sessions and the software that controls transceiving tasks are different software modules. These modules are currently not synchronized at all times, making conventional handset software unsuitable for preventing simultaneous transmission. Another means to prevent simultaneous transmissions while maintaining system state information is to modify network elements. Modifying network elements, however, requires costly and time consuming deployments. Further, it could hamper or constrain future mobile telephony growth areas, such as implementations for redundant networking capabilities.

SUMMARY OF THE INVENTION

A solution that utilizes software/firmware in a handset of a dual mode mobile communication device to avoid dual transmit states. More specifically, a data session manager can detect and control data sessions to avoid simultaneous data session based transmissions and voice/dispatch session based transmissions. The solution can establish at least three different states for data communication sessions, which include an active state, a dormant state, and a disconnected state. Dispatch and voice sessions can have two states, an active state and a disconnected state. In a dormant state, system and network connectivity can be maintained while transmissions can be disabled. The data session manager can shift an active data session to a dormant state immediately before permitting a dispatch call, where the handset can establish a dispatch session. After the dispatch call has been ended, the dispatch session can be stopped and the original data session can be toggled from the dormant state to an active state.

In one embodiment, the data session manager can prevent simultaneous transmissions by interacting with a main handset modem controller. To elaborate, the data session manager can notify the main handset modem controller before acquiring any data traffic. This enables the modem controller to fulfill any requirements relating to blocking data sessions when other services are active (e.g., no data sessions are permitted when dispatch services are active). The data session manager can also be configured to terminate a data session when so requested by the modem controller. The data session manager can notify the modem controller whenever a data traffic channel changes its state, which permits the other modems to be blocked whenever a data channel is being used. In one configuration, the solution can establish one or more special states related to data transmissions, such as dedicated data transmission mode, which disables interconnect and/or dispatch calls, and a disabled data transmission mode, where data transmissions are not permitted.

The present invention can be implemented in accordance with numerous aspects consistent with the material presented herein. For example, one aspect of the present invention can include a dual transmit mobile communication device that includes multiple modems, a modem controller, and a data session manager. The modem controller can programmatically control the modems. The data session manager can manage data sessions of the mobile communication device. The data session manager can programmatically interact with the software modem controller to ensure that only one of the modems is transmitting at any one time. States of data communication sessions can be automatically adjusted as necessary. For example, the modem controller can block transmissions over a data traffic channel in order to use a modem other than one associated with the data traffic channel, such as using a modem to handle a dispatch session. The data session manager can preserve state information of blocked data sessions, so that the sessions can be resumed when a modem is available.

Another aspect of the invention can include a method for preventing dual transmissions from concurrently occurring within a dual transmit capable mobile communication device. The method can include a step of identifying a modem controller that programmatically controls more than one modem. A data session manager can interact with the modem controller before performing any activity changing an activation state of a data traffic channel. For example, before a data traffic channel is acquired the modem controller can be queried to determine if a modem for the data traffic channel is available. The modem controller can prevent the data session manager from activating a data traffic channel whenever a modem other than the modem needed for the data traffic channel is active.

Still another aspect of the invention can include another method for preventing a mobile communication device from performing concurrent dual transmissions. A data transmission channel can be associated with a first modem. An active data session can be established over the data transmission channel. An event can be detected for establishing a communication channel associated with a second modem. The first modem can be blocked so that transmissions over the data transmission channel are prevented. The data session can be changed from an active state to a dormant state. After the blocking step occurs, the communication channel can be established and the second modem can be enabled to permit transmissions over the second communication channel.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
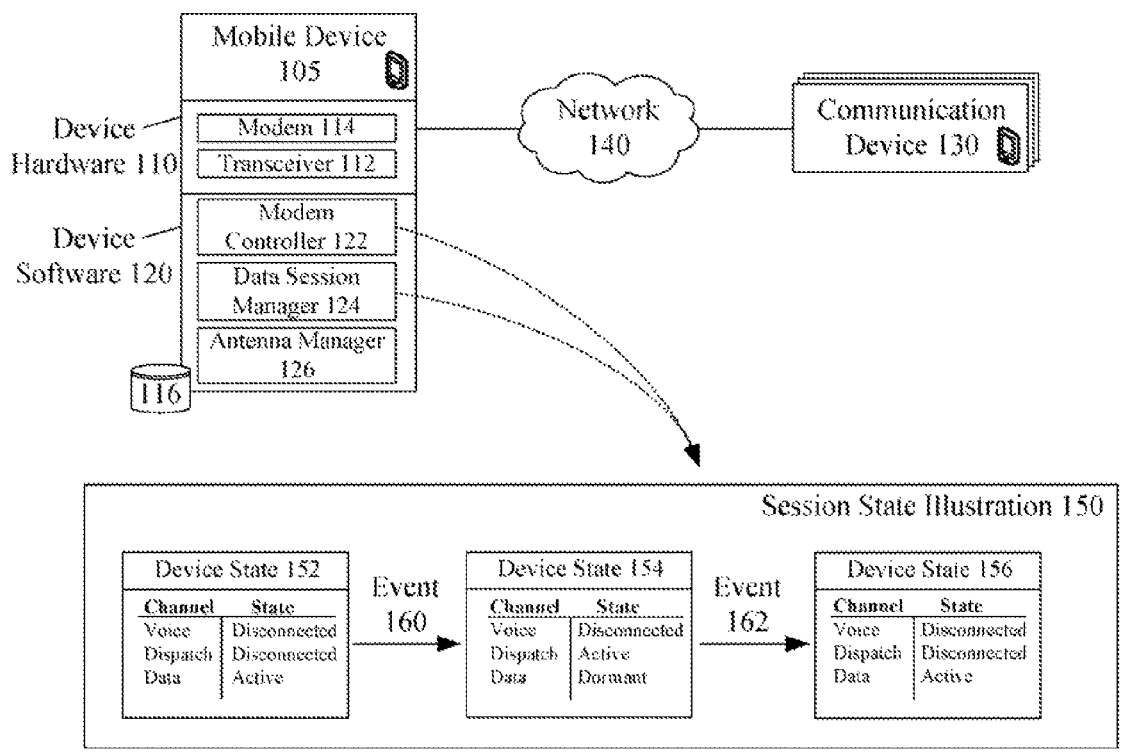
FIG. 1 is a schematic diagram of a system in which a dual mode mobile communication device includes software that avoids dual transmit states in accordance with an embodiment of the inventive arrangements disclosed herein.

FIG. 1 is a schematic diagram of a system 100 in which a dual mode mobile communication device 105 includes software 120 that avoids dual transmit states in accordance with an embodiment of the inventive arrangements disclosed herein.

System 100 can include a mobile communication device 105 having hardware 110 that enables the device 105 to communicate over more than one communication channel. For example, the hardware can permit the device 105 to communicate using a voice or interconnect channel, a dispatch channel, and/or a data channel. The hardware 110 can be capable of simultaneous transmissions over more than one of the communication channels, which could be a disfavored hardware capability for numerous reasons. For example, simultaneous transmissions could result in the device 105 violating Specific Absorption Rate (SAR) requirements and/or violating a contractual agreement between a device 110 manufacturer and a service provider. In another example, the software/firmware infrastructure of the device 110 can be designed to handle a single active communication session at a time, and concurrent sessions can result in unpredictable behavior.

The device software/firmware 120 can be designed to prevent the device 105 from concurrently transmitting over more than one communication channel. More specially, the software 120 can ensure that only one communication channel is in an active transmission state at a time. Voice channels, dispatch channels, and data channels can each be placed in an active or disconnected state, while data channels can also be placed in a dormant state.

In an active state, transceiving resources of the mobile device 105 can be allocated to the associated communication channel and connectivity information in a link layer can be maintained for the device 105 and a remote device 130 communicating over the channel. In a dormant state, transceiving resources for the device can be deallocated to the associated communication channel, but connectivity information in a link layer can be maintained. Communication session state information can also be maintained while in a dormant state. When in a disconnected state a link layer connection can be closed and no transceiving resources can be consumed for an associated channel.

Session state illustration 150 provides an example where the software 120 controls transmission states of the device 105. The device 105 can begin in device state 152, where a voice channel has a disconnected channel state, a dispatch channel is in a disconnected state, and a data channel is in an active state. Event 160 can occur, where an incoming dispatch communication is detected. Assuming the dispatch has higher priority than the data channel communication, which can be a configured by a user of device 105, Event 160 results in the device changing to device state 154, where the previously active data channel is placed in a dormant state and the dispatch channel is placed in an active state. Event 162 can then occur, where no active traffic can be conveyed over the dispatch channel for a previously determined duration. This can result in device state 156, where the dispatch channel is placed in a disconnected state and the data channel is returned to an active state from the dormant state. Activities of the data channel, which were temporarily interrupted due to the dormant state transition, can automatically resume. New dispatch messages can result in the data channel being placed in a dormant state and the dispatch being placed in the active state, so that the dispatch messages can be sent/received. In one embodiment, a time-out period can be established, wherein when no channel activities occur before the time-out period is reached, the dormant channel can automatically be changed to a disconnected state.

As shown, mobile communication device 105 can be any dual mode communication device capable of communicating over more than one different type of communication channel. For example, device 105 can be mobile telephone, a notebook computer, a tablet computer, a wearable computer, an embedded computer, a mobile email appliance, a media player, an entertainment system, and the like.

Device 130 can be a mobile communication device, similar to device 105, or can be a fixed device. For example, device 130 can include customer premise equipment (CPE) such as a telephone. Device 130 can also be a desktop computer, a Web server, an automated interactive response system (IRV), and the like.

The device hardware 110 can include one or more transceiver 112 and at least one modem 114. The transceiver 112 can be a wireless transceiver that permits digital content to be exchanged between device 105 and device 130. Different transceivers 112 can be included for communication over different channels. For example, one transceiver 112 can be a wide area network (WAN) transceiver for mobile telephony and data communications and another can be a personal area network (PAN) transceiver for BLUETOOTH, WIFI, and other PAN communications. One or more modems 114 can be used to physically support simultaneous services, such as data and dispatch. Device hardware 110 can also include a data store 116 which can store device software 120, data, communication state information, and the like.

The device software 120 can include a modem controller 122, a data session manager 124, and an antenna configuration manager 126. The antenna configuration manager can perform antenna adjustments needed as different communication channels and transceivers 112 are utilized. The data session manager 124 can manage data channels and communication channels involving data channels. The modem controller 122 can manage which of multiple modems 114 or modem states are active. The data session manager 124 and the modem controller 124 interact with each other to prevent concurrent or simultaneous transmissions as described herein.

Network 140 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 140 can include local components and data pathways necessary for communications to be exchanged among computing device components and between integrated device components and peripheral devices. The network 140 can also include network equipment, such as routers, data lines, hubs, and intermediary servers which together form a packet-based network, such as the Internet or an intranet. The network 140 can further include circuit-based communication components and mobile communication components, such as telephony switches, modems, cellular communication towers, and the like. The network 140 can include line based and/or wireless communication pathways.

Data store 16 can be a physical or virtual storage space configured to store digital content. Data store 116 can be physically implemented within any type of hardware including, but not limited to, a magnetic disk, an optical disk, a semiconductor memory, a digitally encoded plastic memory, a holographic memory, or any other recording medium. Further, data store 116 can be a stand-alone storage unit as well as a storage unit formed from a plurality of physical devices. Additionally, content can be stored within data store 116 in a variety of manners. For example, content can be stored within a relational database structure or can be stored within one or more files of a file storage system, where each file may or may not be indexed for information searching purposes.

Figure 2:
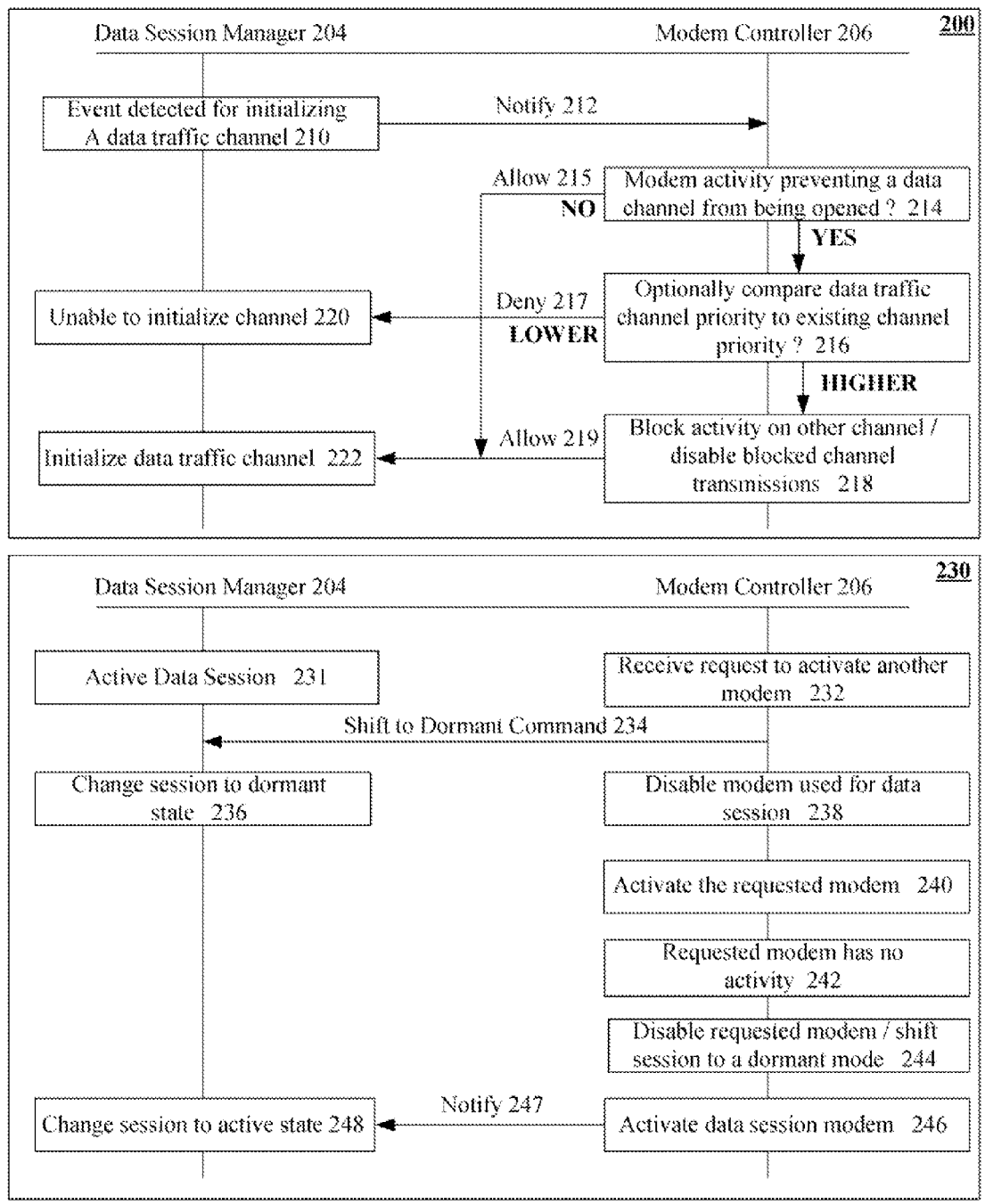
FIG. 2 includes a set of flow diagrams and showing interactions between a modem controller and a data session manager in accordance with an embodiment of the inventive arrangements disclosed herein.

FIG. 2 includes a set of flow diagrams 200 and 230 showing interactions between a modem controller and a data session manager in accordance with an embodiment of the inventive arrangements disclosed herein. The flow diagrams 200 and 230 can be implemented in the context of a system 100 or other such system where mobile device software/firmware prevents a dual capable mobile device from entering a dual transmit state.

Diagram 200 illustrates how the data session manager 204 ensures that the no data session is placed in an active state while a modem controlled by the modem controller 206 is actively transmitting. In step 210, the data session manager 204 can detect an event for initializing a data traffic channel. The data session manager 204 can notify 212 the modem controller 206 of the event 210. Upon being notified 212, the modem controller can determine 214 if any current modem activity exists that could prevent a data channel from being opened. For purposes of this determination 214, only one modem is able to be simultaneously active. If no preventative activity exists, the modem controller 206 can send an allowance message 215 to the data session manager 204. Upon receiving the allowance 215, the data session manager 204 can initialize 222 a data traffic channel for the event.

When activity exists to prevent the data channel from being opened, diagram 200 can progress to step 216, where a priority of the data traffic channel can be optionally compared against a priority of an existing channel. When the data traffic channel has a lower priority, a message 217 can be sent to the data session manager 204 to deny the initialization attempt. In step 220, the data session manager 204 can be unable to initialize the channel due to the denial message 217. When the data traffic channel has a higher priority, the diagram 200 can progress to step 218. In step 218, activity can be blocked on the currently active channel, which disables transmissions over the blocked channel. After the previously active channel is blocked, an allowance message 219 can be conveyed to the data session manager 204. The data session manager 204 can then initiate a data traffic channel 222, which can require use of a modem controlled by modem controller 206.

Diagram 230 illustrates an interaction where an active data session 231 is selectively switched between an active and a dormant state, depending on whether a modem not associated with the active data session is needed to handle transmissions over a different channel. The modem controller 206 can receive 232 a request to activate a modem. The request can come from a component other than the data session manager 204. For instance, a dispatch channel can be initialized by a mobile communication component other than manager 204. It is assumed for purposes of diagram 230 that the request has a greater priority status than a priority status associated with the active data session. In one embodiment, the data session manager 204 can selectively operate in a data dedicated mode where interruptions of an active data session 231 are prevented. No such data dedicated mode is active in diagram 230.

Responsive to the request 232, a message 234 to shift the data session to a dormant state can be sent to the data session manager 204. The data session manager 204 can change the previously active data session to a dormant state 236. After sending message 234, the modem controller 206 can disable a modem used for the data session 238. Then, controller 206 can activate 240 a modem to handle the request.

If a predetermined time period passes, where the active modem is inactive 242, the controller 206 can disable 244 that modem and shift the associated communication session to a dormant mode. The data session modem can then be activated 246. Once active, a notification message 247 can be sent to the data session manager 204, which changes the dormant session to an active state 248. The data session manager can continue in the active state, until transmission activity requiring the other modem is detected. At that point, steps 232-240 can be repeated.

It should be appreciated that the presented solution for software controlling a dual mode mobile communication device to prevent a dual transmit state can be adapted to an architecture of any mobile communication device. Adaptions for architectures can include architectures that utilize a single or centralized interface for handling services, such as Telephony Application Programming Interface (TAPI) or DEFINITY Application Program Interface (DAPI). The solution is also able to be utilized for architectures not having a single interface point, such as the MANHATTAN DATA ARCHITECTURE used in some Motorola mobile telephones.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means nay expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A dual transmit mobile communication device comprising:
   a plurality of modems;
   a modem controller configured to programmatically control the modems; and
   a data session manager configured to manage data sessions of the mobile communication device, wherein the data session manager programmatically interacts with the modem controller to ensure that only one of the modems is transmitting at any one time;
   wherein the modem controller is configured to selectively block an active modem, associated with an active session on a first channel, from transmitting and activate a different modem to support a different session associated with a different channel in response to a request for the different session;
   wherein the active modem associated with the first channel will be blocked and the different modem activated if the different session has a greater priority status than a priority status associated with the active session, and the request will be denied and the active modem will remain active if the different session associated with the request has a lower priority status than the priority status associated with the active session.

2. The device of claim 1, wherein the data session manager manages a plurality of session states for data sessions, said session states including a disconnected state, a dormant state, and an active state, wherein in the disconnected state a link layer connection is closed and no transmissions are permitted for the associated session, wherein in the dormant state a link layer connection is maintained and no transmissions are permitted for the associated session, and wherein in the active state a link layer connection is maintained and transmissions are permitted for the associated session.

3. The device of claim 1, wherein the data session manager notifies the modem controller before acquiring a data traffic channel for a data session, wherein acquiring the data traffic channel is dependent upon a response the data session manager receives from the modem controller.

4. The device of claim 1, wherein the data session manager notifies the modem controller whenever a state change for a data traffic channel occurs, wherein the modem controller uses the state change notifications to ensure that when a modem associated with the data traffic channel is able to transmit, other ones of the modems are blocked from transmitting.

5. The device of claim 1, wherein the data session manager is able to place the modem controller in a data dedicated transmission mode, where interconnect and dispatch call sessions are not permitted until the data dedicated transmission mode is changed.

6. The device of claim 1,
   wherein the data session manager is configured to periodically check a state of sessions managed by the data session manager with associated modems controlled by the software modem controller, wherein when the check indicates a state of a data session managed by the data session manager is inconsistent with the associated state of the corresponding modem, the data session manager updates its state information and executes programmatic instructions consistent with the updated state information.

7. The device of claim 1, wherein hardware permits at least two of the modems to transmit at one time.

8. The device of claim 1, wherein the modem controller and the data session manager are implemented in software of the mobile communication device, and wherein the mobile communication device is a mobile telephone.

9. The device of claim 1, wherein at least one of the modem controller and the data session manager are implemented in firmware of the mobile communication device, and wherein the mobile communication device is a mobile telephone.

10. The device of claim 5, wherein the data session manager manages a plurality of session states for data sessions, said session states including a disconnected state, a dormant state, and an active state, wherein in the disconnected state a link layer connection is closed and no transmissions are permitted for the associated session, wherein in the dormant state a link layer connection is maintained and no transmissions are permitted for the associated session, and wherein in the active state a link layer connection is maintained and transmissions are permitted for the associated session.

11. The device of claim 5, wherein the data session manager notifies the modem controller before acquiring a data traffic channel for a data session, wherein acquiring the data traffic channel is dependent upon a response the data session manager receives from the modem controller.

12. The device of claim 5, wherein the data session manager notifies the modem controller whenever a state change for a data traffic channel occurs, wherein the modem controller uses the state change notifications to ensure that when a modem associated with the data traffic channel is able to transmit, other ones of the modems are blocked from transmitting.

13. The device of claim 6, wherein the data session manager is able to place the software modem controller in a data dedicated transmission mode, where interconnect and dispatch calls are not permitted until the data dedicated transmission mode is changed.

14. The device of claim 5, wherein hardware permits at least two of the modems to transmit at one time.

15. The device of claim 5, wherein the modem controller and the data session manager are implemented in software of the mobile communication device, and wherein the mobile communication device is a mobile telephone.

16. The device of claim 5, wherein at least one of the modem controller and the data session manager are implemented in firmware of the mobile communication device, and wherein the mobile communication device is a mobile telephone.

17. The device of claim 1, wherein when the active modem associated with the first channel will be blocked and the different modem activated, the modem controller automatically conveys a message to the data session to indicate the blocking of the active modem, wherein responsive to receiving the message, the data session manager automatically changes a state of the active session associated with the data traffic channel from an active state to different state.

* * * * *